United States Patent
Smith

(10) Patent No.: US 7,124,632 B2
(45) Date of Patent: Oct. 24, 2006

(54) ELECTRONICALLY CONFIGURABLE RATE SENSOR CIRCUIT AND METHOD

(75) Inventor: Thad W. (Marc) Smith, Antioch, CA (US)

(73) Assignee: BEI Technologies, Inc., San Francisco, CA (US)

( * ) Notice: Subject to any disclaimer, the term of this patent is extended or adjusted under 35 U.S.C. 154(b) by 37 days.

(21) Appl. No.: 10/900,056

(22) Filed: Jul. 26, 2004

(65) Prior Publication Data

US 2006/0016259 A1 Jan. 26, 2006

(51) Int. Cl.
G01M 1/14 (2006.01)
G01P 9/00 (2006.01)
G01P 15/14 (2006.01)

(52) U.S. Cl. .................................. 73/504.02; 73/1.82

(58) Field of Classification Search ............. 73/504.02, 73/504.04, 504.12, 504.15, 504.16, 1.82
See application file for complete search history.

(56) References Cited

U.S. PATENT DOCUMENTS

| | | | |
|---|---|---|---|
| 4,654,663 A | 3/1987 | Alsenz et al. ............ 340/870.3 |
| 4,899,587 A | 2/1990 | Staudte .................... 73/504.16 |
| 5,396,144 A | 3/1995 | Gupta et al. ................ 310/370 |
| 5,408,876 A | 4/1995 | Macy ...................... 73/504.16 |
| 5,585,561 A | 12/1996 | Bahl et al. ............... 73/504.16 |
| 6,262,520 B1 | 7/2001 | Knowles .................... 310/370 |
| 6,497,146 B1 | 12/2002 | Hobbs et al. ............. 73/504.12 |
| 6,510,737 B1 | 1/2003 | Hobbs ..................... 73/504.12 |
| 6,553,835 B1 | 4/2003 | Hobbs et al. ............ 73/514.16 |
| 6,568,267 B1 * | 5/2003 | Chida et al. ............. 73/504.12 |

* cited by examiner

Primary Examiner—Daniel S. Larkin
Assistant Examiner—Tamiko Bellamy
(74) Attorney, Agent, or Firm—Edward S. Wright

(57) ABSTRACT

Angular rate sensor and method in which the parameters of a circuit which provides drive signals and processes signals from a sensing element are configured electronically by a programmable memory. Being configured in this manner, the circuit is extremely versatile and can be used with different types of sensing elements.

21 Claims, 3 Drawing Sheets

ELECTRONICALLY CONFIGURABLE RATE SENSOR CIRCUIT AND METHOD

BACKGROUND OF THE INVENTION

1. Field of Invention

This invention pertains generally to angular rate sensors and, more particularly, to an electronically configurable circuit for actuating and processing signals in a vibratory rate sensor.

2. Related Art

In a vibratory rate sensor or gyroscope, a mass is driven to vibrate or oscillate along a drive axis. Rotation of the sensor about an axis perpendicular to the drive axis causes a Coriolis force to be applied to the mass along a response axis which is perpendicular to the drive and sensing axes. The force is proportional to the product of the rate of rotation and the velocity of vibration, and the rate of rotation is determined by monitoring the force or the movement of the mass along the response axis.

Different types of sensing elements are used in such devices. Some are fabricated from silicon wafers, and others are fabricated of crystalline quartz and other piezoelectric materials.

With silicon sensing elements, the masses are commonly driven electrostatically, and the Coriolis induced forces are monitored capacitively. Such structures are generally planar, which tends to maximize the capacitance of the sensing elements.

Piezoelectric rate sensors are commonly in the form of tuning forks having at least one pair of tines which are positioned side-by-side and driven out of phase with each other in the plane of the tines. When the tuning fork is rotated about an axis parallel to the tines, the Coriolis force produces a second (pickup) mode of oscillation in which the tines vibrate in an antiphase manner perpendicular to the plane of the tines. Examples of such rate sensors are found in U.S. Pat. Nos. 4,654,663, 4,899,587, 5,396,144, 5,408,876, 5,585,561 and 6,262,520.

The tuning forks in such rate sensors often have more than one pair of tines, e.g. two pairs of tines arranged in an H-shaped configuration, with one pair being driven in the plane of the fork. The out-of-plane vibration produced by the Coriolis force is torsionally coupled to the other pair of tines, and the two pairs vibrate out-of-plane in opposite directions in the pickup mode. With a central mounting point, the out-of-phase motion of the two sets of tines cancels pickup mode forces at the mounting point, minimizing the effect of boundary conditions at the mount on the pickup mode oscillation.

Regardless of the type of sensing element employed, all rate sensors require certain common elements of electronic circuitry in order to function. Vibratory sensors require an oscillator circuit to produce the primary mode of vibration, and the output of the sensor must be detected, amplified, filtered and/or otherwise processed.

In addition to these common features, the electronic circuitry must also meet the individual requirements of a particular sensing element or type of sensing element. The resonance frequency of different types of vibratory rate sensors can, for example, vary widely even within a given class. Drive mode resonant frequencies can range from about 6 KHz to 40 KHz, and the strength of the output signal derived from the various devices can vary over a wide range, depending upon their size and efficiency. Output noise and bandwidth requirements also vary considerably.

In safety-critical applications such as automobile stability controls, built-in fault detection is also highly desirable. However, variations among sensors can make fault detection difficult since it depends, inter alia, upon the range and sensitivity of the sensor.

Heretofore, the variation among sensors has required specially adapted circuitry for driving and processing the signals produced by different types and sub-types of sensing elements. This has generally required either a unique integrated circuit for each type or sub-type of sensing elements or a multitude of external components which must be modified to configure an integrated circuit for use with a particular sensing element.

OBJECTS AND SUMMARY OF THE INVENTION

It is, in general, an object of the invention to provide a new and improved rate sensor circuit and method.

Another object of the invention is to provide a circuit and method of the above character which are electronically configurable.

These and other objects are achieved in accordance with the invention by providing an angular rate sensor and method in which the parameters of a circuit which provides drive signals and processes signals from a sensing element are configured electronically by a programmable memory. Being configured in this manner, the circuit is extremely versatile and can be used with different types of sensing elements.

DETAILED DESCRIPTION

Figure 1A:
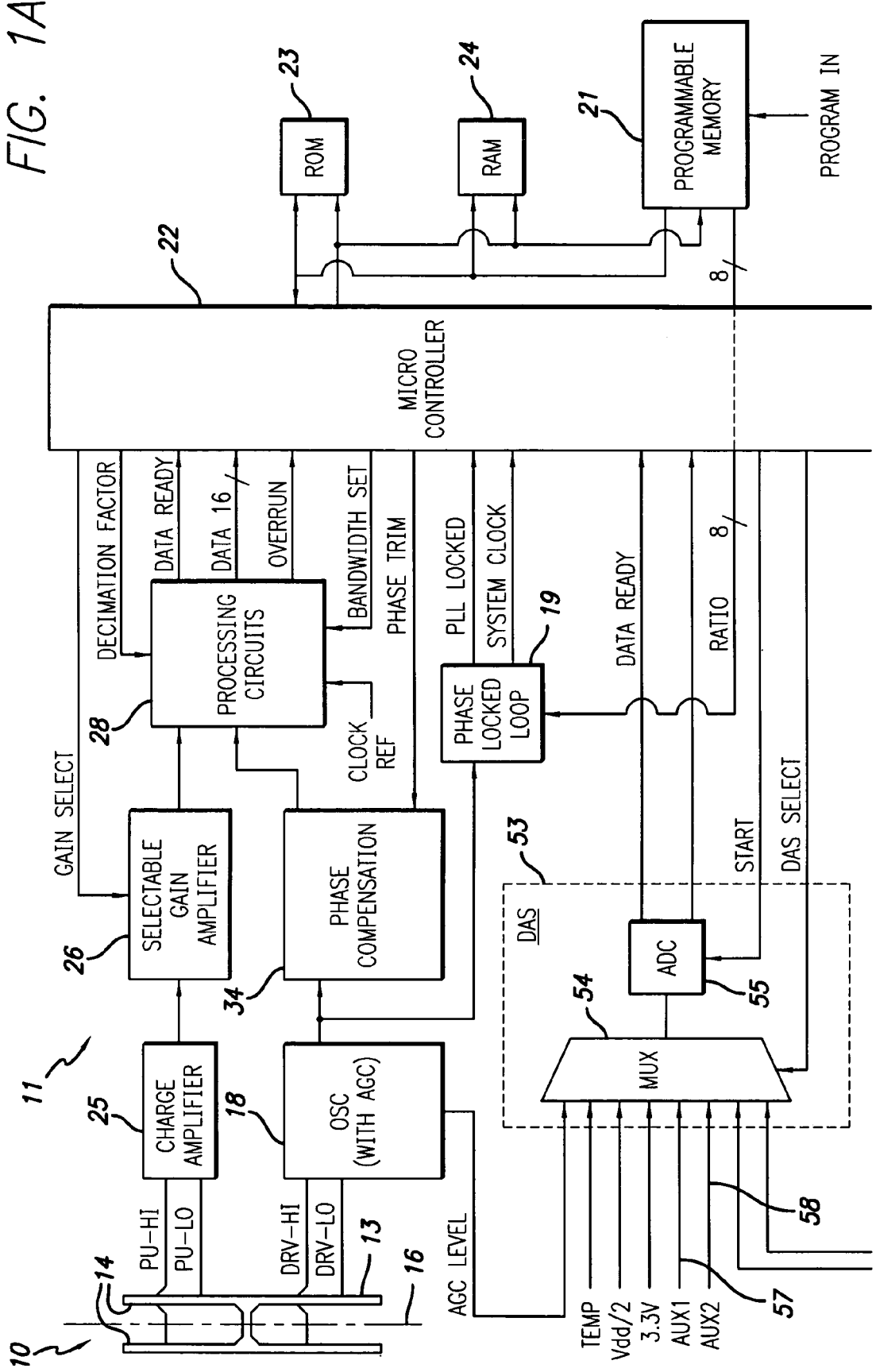
FIG. 1 is a block diagram of one embodiment of a rate sensor with an electronically configurable actuation and signal processing circuit incorporating the invention.
Figure 1B:
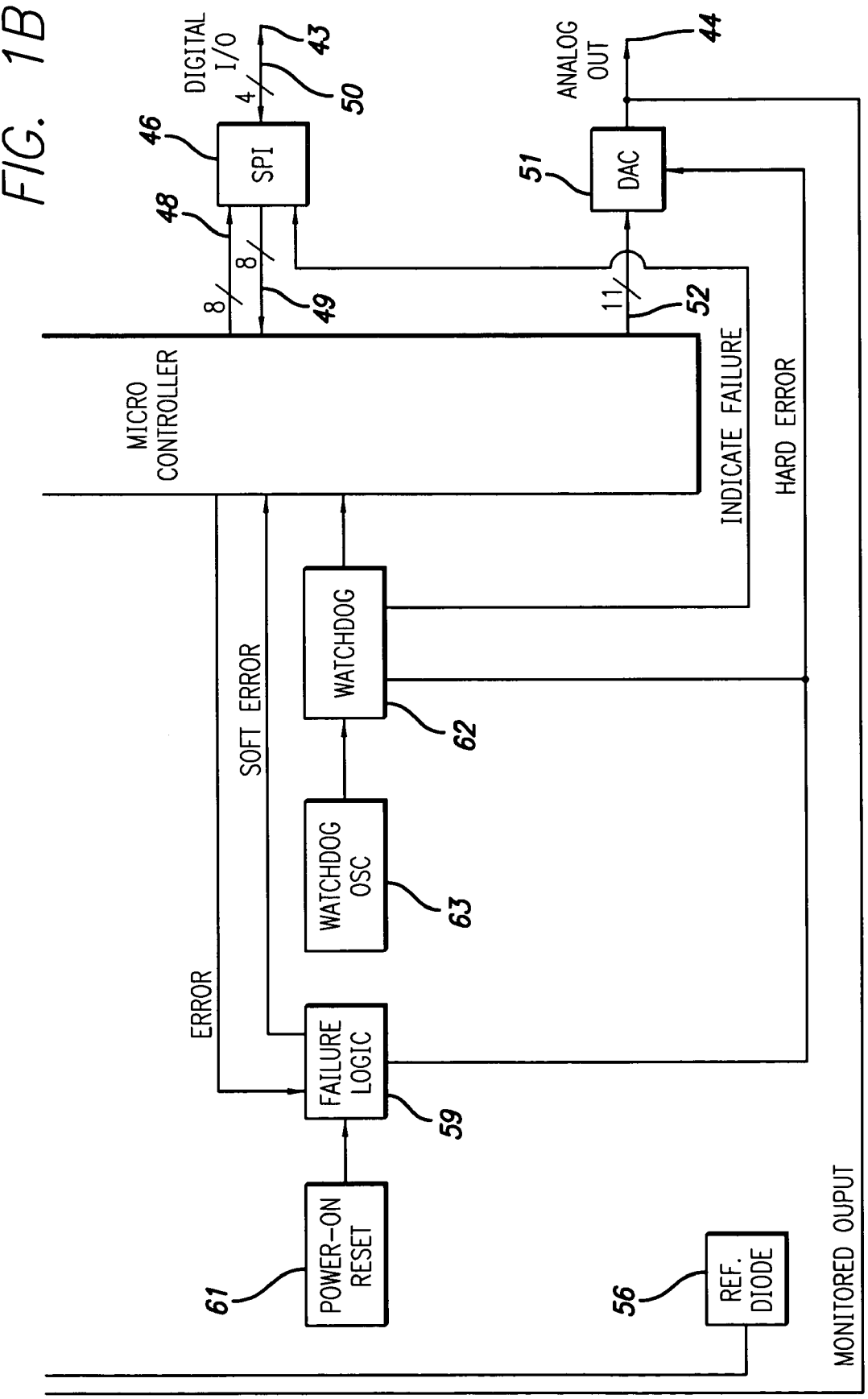

The rate sensor consists of a sensing element 10 and a circuit 11 for driving and processing signals from the sensing element. In the embodiment illustrated in the drawings, the sensing element is in the form of a double-ended tuning fork which is fabricated of single crystal quartz material and has an H-shaped configuration with drive tines 13 at one end and pickup tines 14 at the other.

Each pair of tines is disposed symmetrically about the longitudinal axis 16 of the tuning fork. Drive high and drive low signals are applied to electrodes on the drive tines, and pickup high and pickup low signals are received from electrodes on the pickup tines. Although the sensing element is illustrated as being a double ended tuning fork, any other type of vibratory sensing element, including a single ended tuning fork, can also be utilized, if desired.

The drive signals are generated by an oscillator 18 with automatic gain control (AGC), which can, for example, be of the type disclosed in U.S. Pat. No. 6,510,737. This circuit excites the drive tines to vibrate at the natural frequency of the drive mode, with the AGC maintaining the amplitude of the drive mode vibration at a substantially constant level.

The oscillator also provides a reference signal to a phase locked loop (PLL) circuit 19 which operates at an integral multiple of the oscillator frequency. The multiple or ratio is configurable to accommodate the drive frequencies of different sensing elements and is stored as an 8-bit word in a programmable memory 21. Thus, for example, a PLL circuit designed to operate within a band of 16 MHz±0.8 MHz can be used with sensors having drive frequencies on the order of 6–40 KHz by multiplying the oscillator frequency by an integer in the range of 380 to 2800.

Memory 21 can be any suitable non-volatile memory that can be programmed electronically from outside the sensor, typically via one or more of the input/output (I/O) terminals of the sensor. In one presently preferred embodiment, the memory is a "Zener-zap" array with a plurality of one-time programmable 8-bit words. However, other well known types of programmable memory, e.g. EEPROM, can be used, if desired.

The system also includes a micro-controller 22 with read only memory (ROM) 23 and random access memory (RAM) 24. The PLL circuit provides a PLL LOCKED signal to the micro-controller when it is locked, and it also provides a SYSTEM CLOCK signal to the micro-controller.

The angular rate signal from sensing element 10 is applied to a charge amplifier 25, and the output of the charge amplifier is connected to a selectable gain amplifier 26 which can provide a signal of suitable level for processing purposes from sensing elements having a wide range of output sensitivities. The gain of amplifier 26 is selected or controlled by a GAIN SELECT signal from micro-controller 22. The GAIN SELECT signal is derived from or controlled by data in programmable memory 21, and in one presently preferred embodiment, it is in the form of a 2-bit word that provides four gain settings in steps of 6 dB, e.g. 9, 15, 21 and 27 dB.

Those settings will accommodate sensing elements which vary over a range of about 8:1 in output sensitivity.

Figure 2:
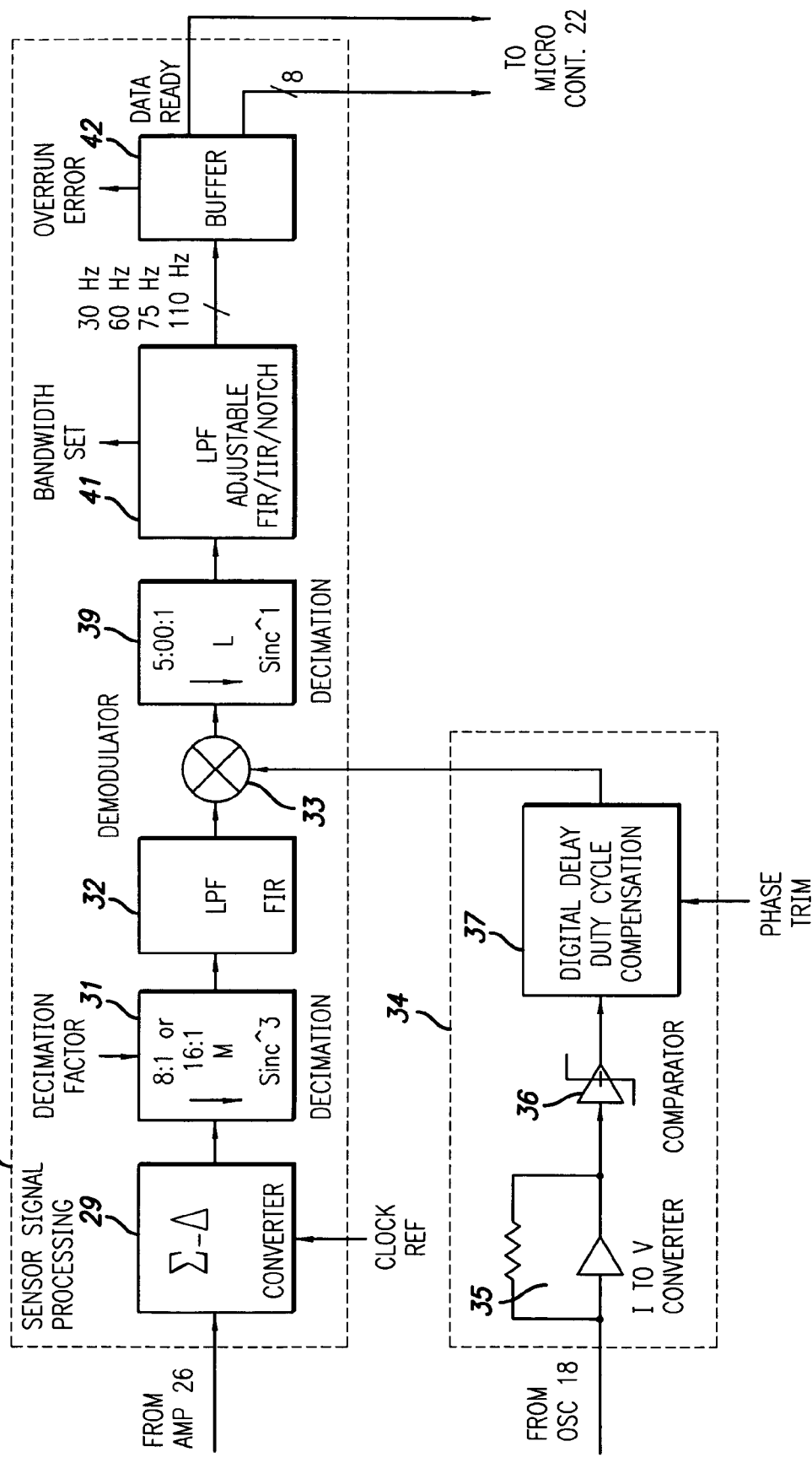
FIG. 2 is a more detailed block diagram of the signal processing and phase compensation circuits in the embodiment of FIG. 1.

As illustrated in FIG. 2, the rate signal from amplifier 26 goes to a signal processing section 28 where it is converted to digital form by a sigma-delta analog-to-digital converter (ADC) 29. That converter typically operates at a submultiple of the system clock rate, and with a system clock operating at 16 MHz, the sigma-delta converter might, for example, operate at a frequency of 4 MHz or 8 MHz, with a CLOCK REF signal for the converter being obtained by dividing down the system clock by a factor of 4 or 2.

The 1-bit signal from the sigma-delta converter is passed through a decimation filter 31. In one currently preferred embodiment, the filter is a comb or third order sinc filter with a decimation factor M of 8:1 or 16:1, which delivers an output signal at 500 KHz in response to a 4 MHz or 8 MHz signal from the sigma-delta converter, with approximately 96 dB of rejection at 489 KHz. The decimation factor is selected by a DECIMATION FACTOR signal from the micro-controller.

The decimation filter is followed by a low pass finite impulse response (FIR) filter 32 which, in the embodiment illustrated, has a cut-off frequency of 500 KHz, with approximately 30 dB of rejection at the 30 KHz point.

The signal from low pass filter 32 is applied to a digital demodulator 33 where it is demodulated at the drive frequency in accordance with a reference signal derived from oscillator 18. The oscillator signal passes through a phase compensation circuit 34 comprising a current-to-voltage converter 35, a comparator 36 and a digital delay circuit 37 before being applied to the demodulator. The phase shift provided by the delay circuit is controlled by a PHASE TRIM signal stored in programmable memory 21.

The phase adjustment provided by the digital delay circuit provides means for minimizing quadrature errors in the rate signal which typically arise from imbalances or asymmetries in the sensing element. The error signals are rejected by the demodulator when it is operating in phase with the drive signal because they are 90 degrees out of phase with the rate signal.

However, a phase error in the demodulation reference signal will cause a portion of the quadrature signal to be detected as angular rate, and it is therefore important that the reference signal used for demodulation be closely in-phase with the tine velocity.

Since the amount of phase compensation required may depend upon factors such as sensor frequency, the ability to control it electronically is important. If a wider range of phase control is desired, a second phase control circuit (not shown) can be included in the system and also controlled by a signal from the programmable memory 21. Together the two circuits can provide both coarse and fine phase adjustments. In one current embodiment, one of the circuits has more than 180 degrees of phase range and can be used to invert the polarity of the output signal, if desired, and the other allows the phase of the demodulator to be adjusted in steps of less than 0.5 degree.

In the example given, with the sigma-delta converter operating at 4 MHz or 8 MHz, and the 500 KHz filters, the demodulator outputs 16-bit words at rate of 500 KHz.

The signal from the demodulator passes through a second decimation filter 39 which, in the embodiment illustrated, is a comb or first-order sinc filter with a decimation rate of 500:1 that steps the 16-bit words down to a rate of 1 KHz.

The output of the second decimation filter goes to another low pass filter 41 which can be electronically configured to adjust the output bandwidth of the sensor. This filter can be a finite impulse response (FIR) filter, an infinite impulse response (IIR) filter, or a notch filter, and in the embodiment illustrated, bandwidth settings of 30 Hz, 60 Hz, 75 Hz and 110 Hz can be selected by a BANDWIDTH SET signal from the micro-controller.

The signal from the processing circuits is applied to the micro-controller through a buffer 42 and held in the buffer until it is read by the micro-controller. That signal is in the form of 16-bit words delivered at a rate of 1 KHz. The processing circuits also send a DATA READY signal to the micro-controller to indicate that the output data has changed. In the event of an overflow, the buffer will deliver an overflow signal to the micro-controller.

The sensor has both a digital output 43 and an analog output 44. The digital output is part of a digital input/output (I/O) port which is provided by a standard serial peripheral interface (SPI) 46 which communicates with the micro-controller via 8-bit data lines 48, 49 and includes a 4-line data bus 50. The analog port is provided by an 11-bit digital-to-analog converter (DAC) 51 which receives data from the micro-controller via data line 52.

In one embodiment, the micro-controller outputs the rate output signal to the DAC to provide an analog rate output. However, the micro-controller can be configured via data stored in programmable memory 21 to output various other digital signals to the DAC, including, for example, internal reference voltage levels or temperature sensor output.

The micro-controller monitors the signal from buffer 42 and the other signals which are input to it to check for potential failure modes.

If desired, a continuous built-in test bit (CBIT) signal can be added to the charge amplifier, as described in detail in U.S. Pat. No. 6,714,070, the disclosure of which is incorporated herein by reference. The CBIT signal appears as a relatively large angular rate bias offset throughout the entire signal processing path. If something should malfunction anywhere in that path, the magnitude of the bias signal applied to the micro-controller by the buffer 42 at the output of the signal processing circuits will undergo a shift. If the shift exceeds a predetermined threshold, which can be controlled via the programmable memory, the micro-controller will interpret it as a fault.

Other signals are monitored to ensure that faults in other parts of the circuit will be detected. For example, the DATA READY signal from the processing circuits and the DATA READY signal from the data acquisition system (DAS) must be provided within an expected time interval, and the PLL LOCKED signal from the PLL circuit must indicate that a lock is achieved and maintained.

The micro-controller also monitors a number of other signals to check for potential failure modes. Many of those signals are analog in nature, and they are converted to digital form and input to the micro-controller by a data acquisition system (DAS) 53 which includes an input multiplexer 54 and an analog-to-digital converter (ADC) 55. In the embodiment illustrated, the signals which are monitored in this manner include the AGC LEVEL signal from oscillator 18, a temperature sensor voltage TEMP, the virtual ground reference voltage $V_{dd}/2$, the 3.3 volt operating voltage derived from the supply voltage $V_{dd}$, and a diode bias voltage from a reference diode 56.

Monitoring these voltages is one way to provide an approximate check on the internal bandgap reference voltage within the IC in which circuit is constructed. Alternatively, one could switch the voltage reference of the DAC between the bandgap reference voltage and $V_{dd}$ and compare the monitored level of $V_{dd}/2$. A change in the bandgap reference voltage would be detected as a discrepancy between the measured values of $V_{dd}/2$ as monitored with the two different DAC reference sources.

In the embodiment illustrated, the analog angular rate output signal from DAC 51 is also input to multiplexer 54 to provide monitoring of the output signal. This allows the micro-controller to compare the magnitude of the analog output signal with the digital signal level from which it was derived. In this way, the integrity of both DAC 51 and data acquisition system 53 is verified.

In the embodiment shown, multiplexer 54 has two additional inputs 57, 58 which can be used for other analog reference signals or for the analog outputs of external sensors such as temperature sensors or accelerometers.

In the event that the sensor is used with one or more other sensors which do not have their own digital output interfaces, the outputs of those sensors can be applied to inputs 57, 58 and converted to digital form by ADC 55. That will allow digital output data from the other sensors to be transmitted across the SPI bus connected to interface 46, thus eliminating the need for an external ADC and simplifying signal routing.

The signal to be monitored is selected by a DAS SELECT signal which is applied to multiplexer 54 by the micro-controller. At the end of the conversion, the ADC delivers a DATA READY signal to the micro-controller.

Each of the monitored signals can be compared with predetermined values or limits for fault detection. These limits can be encoded in the micro-controller ROM 23 and/or electronically configured via programmable memory 21. For example, since temperature should vary only gradually with time, any sudden jump in the temperature signal can be interpreted as a fault.

In the event that a failure is detected, the micro-controller delivers an ERROR signal to a failure logic circuit 59, where the error can be flagged in two ways. In one, the logic circuit sends a SOFT ERROR signal to serial interface 46 via the micro-controller, and failure is indicated as part of the serial I/O signal, possibly as an error code along with the suspect angular rate data. This is sometimes referred to as "soft" error flagging since the output is still provided. In the other, the failure logic circuit sends a HARD ERROR signal to DAC 51 which causes the analog output of the DAC to shift to a predetermined level that is programmable and is usually set to the positive voltage rail. With "hard" error flagging, the analog output is no longer provided after a failure is detected. Both types of error flagging can be utilized simultaneously, if desired.

Alternatively, instead of having a separate failure logic circuit 59 which does the error flagging, that function can be embedded in the micro-controller and its internal ROM, in which case both "hard" and "soft" error flagging can still be used.

Many aspects of the internal fault detection and error handling can be configured externally via data stored in programmable memory 21. One such aspect, for example, is the upper and lower control limits for monitored signals or the maximum allowable difference (i.e. change or step) between readings of sensor output or other monitored parameters, either consecutive or averaged readings. Another is the allowable time interval between the onset of a detected error and the setting of an error flag, or whether an error flag can be reset via external input through SPI interface 46.

In another externally configurable option of the circuit, DAC 51 provides a continuous low-level DC voltage output signal in the absence of detected failures and switches to a high voltage level, e.g. the positive voltage rail, upon detection of a failure.

At start-up, the "soft" error flagging is temporarily suspended or suppressed to allow the system consisting of the sensing element and the circuit to become fully active. In that regard, the failure logic circuit 59 is reset by a signal from a power-on reset circuit 61 when power is first applied or when the supply voltage drops below a critical threshold. However, the analog output at port 44 preferably remains at the positive voltage rail until the completion of the start-up sequence when the micro-controller has verified that all signals are within their predetermined acceptance limits.

A watchdog detector 62 is included in the circuit to prevent the possibility of the micro-controller failing without being detected. This detector is of conventional design, and it is clocked by a signal from an oscillator 63 which operates independently of the system clock. A fault or failure in the micro-processor is indicated at the output of the sensor.

A failure detected by the watchdog circuit 62 is communicated to the micro-controller. Failures are indicated at both analog and digital outputs, the first via a signal to DAC 51 ("hard failure"), the second by a failure indication signal sent to the SPI interface 46.

The programmable, non-volatile memory 21 also contains information for compensating the sensor output to adjust for minor variations in sensing element sensitivity and for sensor bias offsets. These adjustments can also be made dependent on temperature by selecting the temperature signal in DAS 53 and inputting it to the micro-controller. This signal is averaged to reduce the effects of noise, then combined with the information stored in the programmable memory to compute compensation values appropriate for the current temperature reading.

Such compensation can be done, for example, by using a polynomial in which the variation in output compensation values is a function of temperature and by storing the coefficients of the polynomial in the programmable memory. In the case of output bias offset, the value of the polynomial computed for the current temperature is subtracted from the uncompensated sensor output. A similar computation can be made for output sensitivity. This serves to significantly reduce spurious variation of the sensor output signal with changes in temperature as compared with the uncompensated output signal.

If external sensor signals are monitored via external inputs 57, 58 and ADC 55, those signals can also be compensated for variations in sensitivity, offset variations, and/or thermal effects, if desired. The information required for such compensation can be stored in programmable memory 21, and this will improve the performance of multiple sensors without adding unnecessary complexity to the other sensors.

The invention has a number of important features and advantages. It provides a circuit which is electronically configurable and can be programed externally to alter the properties of the circuit to best adapt them to a specific sensing element. The circuit also provides fault detection which can be configured externally to specific sensor requirements.

The circuit can be constructed in the form of a single integrated circuit which requires few, if any, external components. This results in a sensor with significantly reduced cost, and enables a manufacturer to produce sensors which are configured specifically for different customers from a single combination of sensing element and circuit, thereby minimizing the variation in designs.

The circuit is electronically programmable both for the calibration of individual sensor output characteristics and for the configuration of internal signal processing attributes. The programming is done through a non-volatile, programmable internal memory that holds the information for the programmable and configurable attributes of the circuit's function. The memory is usually programmed as part of the factory testing during manufacture of the sensors.

This sensor requires no hand-soldered external components for calibration of the output signal. Compensation values for factors such as temperature and output sensitivity can be loaded into the sensor via an electronic interface and stored in the internal memory. Those values are utilized in the internal signal processing circuitry to compensate or correct the sensor output.

The internal electrical parameters of the circuit can also be programmed or configured through the electronic interface to be the optimally adapted for a particular type of sensing element. This allows the circuit to be used with different types of sensing elements.

It is apparent from the foregoing that a new and improved rate sensor circuit and method have been provided. While only certain presently preferred embodiments have been described in detail, as will be apparent to those familiar with the art, certain changes and modifications can be made without departing from the scope of the invention as defined by the following claims.

The invention claimed is:

1. An angular rate sensor circuit which can be configured electronically for use with different sensing elements that experience a Coriolis force when vibrated along a drive axis and rotated about a sensing axis, comprising: means for applying drive signals to a sensing element to cause the sensing element to vibrate along the drive axis, a micro-controller, an externally programmable memory associated with the micro-controller, an amplifier having a gain controlled by the micro-controller and data in the programmable memory for increasing the level of a Coriolis induced analog rate signal from the sensing element, an analog-to-digital converter for converting the rate signal to a digital signal, and means controlled by the micro-controller and data in the programmable memory for adjusting and/or calibrating the digital signal.

2. The rate sensor circuit of claim 1 including a filter having a bandwidth controlled by the micro-controller and data stored in the programmable memory for filtering signals from the sensing element.

3. The rate sensor circuit of claim 1 including an oscillator for providing a drive signal for the sensing element, a demodulator for demodulating a rate signal from the sensing element with a reference signal derived from the oscillator, and means configured in accordance with data stored in the programmable memory for adjusting the phase relationship between the reference signal and the vibration of the sensing element.

4. The rate sensor circuit of claim 1 including means configured in accordance with data stored in the programmable memory for detecting a failure in the circuit.

5. The rate sensor circuit of claim 4 including means controlled by data stored in the programmable memory and responsive to detection of a failure for setting a soft error flag in which an indication of an error is delivered along with a suspect rate signal from the circuit and a hard error flag in which the rate signal is interrupted.

6. A method of configuring an angular rate sensing circuit for use with different sensing elements, comprising the steps of: applying drive signals to a sensing element to cause the sensing element to vibrate along a drive axis, increasing the level of Coriolis induced analog rate signals produced by the sensing element with an amplifier, converting the analog rate signals to digital signals, setting the gain of the amplifier with a micro-controller having an eternally programmable memory associated therewith, adjusting and/or calibrating the digital signals with the micro-controller, and eternally programming the memory to control the gain of the amplifier and the adjustment and/or calibration of the digital signals.

7. The method of claim 6 including the steps of filtering signals from the sensing element with a filter, and controlling the bandwidth of the filter in accordance with data stored in the externally programmable memory.

8. The method of claim 6 including the steps of providing the drive signals for the sensing element with an oscillator, demodulating the rate signals from the sensing element with a reference signal derived from the oscillator, and adjusting the phase relationship between the reference signal and the vibration of the sensing element in accordance with data stored in the programmable memory.

9. The method of claim 6 including the step of detecting a failure in the circuit in accordance with information stored in the programmable memory.

10. The method of claim 9 including the steps, upon detection of a failure, of setting a soft error flag in which an indication of an error is delivered along with a suspect rate signal from the circuit and setting a hard error flag in which the rate signal is interrupted.

11. The method of claim 10 wherein the setting of the error flags is controlled by data in the programmable memory.

12. An angular rate sensor, comprising; a sensing element which experiences a Coriolis force when vibrated along a drive axis and rotated about a sensing axis, a micro-controller, an externally programmable memory associated with the micro-controller, an oscillator for providing drive signals for the sensing element, an amplifier having a gain controlled by the programmable memory for increasing the level of a rate signal from the sensing element, an analog-to-digital converter for converting the rate signal to a digital signal, means for demodulating the digital rate signal with a reference signal derived from the oscillator, means controlled by the programmable memory for adjusting the phase of the reference signal, a filter having a bandwidth controlled by the programmable memory for filtering the digital signal, and means controlled by the micro-controller and the programmable memory for providing an output signal corresponding to the rate signal.

13. The rate sensor of claim 12 wherein the means for providing the output signal includes a serial peripheral interface.

14. The rate sensor of claim 12 wherein the means for providing the output signal includes digital-to-analog converter.

15. The rate sensor of claim 12 including means configured by the programmable memory for detecting a failure.

16. The rate sensor of claim 15 including means controlled by data stored in the programmable memory and responsive to detection of a failure for setting a soft error flag in which an indication of an error is delivered along with a suspect rate signal from the circuit and a hard error flag in which the rate signal is interrupted.

17. A method of sensing angular rate, comprising the steps of: applying drive signals to a sensing element with an oscillator to cause the sensing element to vibrate along a drive axis, amplifying a Coriolis induced rate signal produced by the sensing element with an amplifier having a gain controlled by the programmable memory, converting the rate signal to a digital signal, demodulating the digital rate signal with a reference signal derived from the oscillator, adjusting the phase of the reference signal in accordance with information stored in the programmable memory, filtering the digital signal in a filter having a bandwidth controlled by the programmable memory, and providing an output signal corresponding to the demodulated and filtered rate signal.

18. The method of claim 17 wherein the output signal is provided by a serial peripheral interface controlled by the programmable memory.

19. The method of claim 17 wherein the output signal is provided by a digital-to-analog converter.

20. The method of claim 17 including the step of detecting a failure in accordance with information stored in the programmable memory.

21. The method of claim 20 including the steps, upon detection of a failure, of setting a soft error flag in which an indication of an error is delivered along with a suspect rate signal and setting a hard error flag in which the rate signal is interrupted.

* * * * *